United States Patent
Gazzino et al.

(10) Patent No.: US 11,554,875 B2
(45) Date of Patent: Jan. 17, 2023

(54) METHOD OF ELECTRICALLY POWERING AN ELECTRICITY NETWORK, AND AN ELECTRICAL ARCHITECTURE

(71) Applicant: AIRBUS HELICOPTERS, Marignane (FR)

(72) Inventors: Marc Gazzino, Marseilles (FR); Christophe Mouton, Tarascon (FR)

(73) Assignee: AIRBUS HELICOPTERS, Marignane (FR)

( * ) Notice: Subject to any disclaimer, the term of this patent is extended or adjusted under 35 U.S.C. 154(b) by 264 days.

(21) Appl. No.: 16/903,580

(22) Filed: Jun. 17, 2020

(65) Prior Publication Data

US 2021/0024223 A1 Jan. 28, 2021

(30) Foreign Application Priority Data

Jul. 25, 2019 (FR) .................................. 1908442

(51) Int. Cl.
*B64D 31/06* (2006.01)
*B64D 27/24* (2006.01)
(Continued)

(52) U.S. Cl.
CPC ............. *B64D 31/06* (2013.01); *B64D 27/24* (2013.01); *B64D 35/00* (2013.01); *G05F 1/625* (2013.01); *B64D 2221/00* (2013.01)

(58) Field of Classification Search
CPC ........ B64D 31/06; B64D 27/24; B64D 35/00; B64D 2221/00; G05F 1/625
See application file for complete search history.

(56) References Cited

U.S. PATENT DOCUMENTS 5,778,997 A 7/1998 Setaka et al.
6,091,228 A * 7/2000 Chady ...................... B60K 6/46
903/905

(Continued)

FOREIGN PATENT DOCUMENTS

EP 0953472 A2 11/1999
EP 0953472 A3 2/2001
FR 3056555 A1 3/2018

OTHER PUBLICATIONS

Vishizawa, Akira et al. Fuel cell and Li-ion battery direct hybridization system for aircraft applications. Journal of Power Sources. Elsevier. p. 294-300. Sep. 3, 2012. 7 pages.

(Continued)

*Primary Examiner* — Rodney A Bonnette
(74) *Attorney, Agent, or Firm* — Brooks Kushman P.C.

(57) ABSTRACT

A method of electrically powering a non-voltage-regulated electricity network, and also to an electrical architecture. The electrical architecture comprises: a plurality of sources of electrical energy including both at least one rechargeable electrical energy storage device and also an electrical power generation device a main electricity network electrically connected directly to the sources of electrical energy; and pieces of electrical equipment electrically powered by the main electricity network. The method comprises both a first powering step for electrically powering the main electricity network by the rechargeable electrical energy storage device and also a second powering step for electrically powering the main electricity network by the electrical power generation device, followed by a regulating step for regulating an internal voltage of the electrical power generation device as a function of the first power delivered by the rechargeable electrical energy storage device.

20 Claims, 2 Drawing Sheets

(51) Int. Cl.
*B64D 35/00* (2006.01)
*G05F 1/625* (2006.01)

(56) References Cited

U.S. PATENT DOCUMENTS

| | | |
|---|---|---|
| 10,233,768 B1 * | 3/2019 | Watts, III ................ F01D 15/10 |
| 2006/0043938 A1 | 3/2006 | O'Gorman et al. |
| 2008/0143119 A1 | 6/2008 | Asada |
| 2010/0038473 A1 * | 2/2010 | Schneider ............. F16F 15/134 |
| | | 184/6.12 |
| 2019/0382123 A1 * | 12/2019 | Schwarz ................... F02C 6/20 |
| 2020/0115062 A1 | 4/2020 | Klonowski et al. |
| 2021/0039801 A1 * | 2/2021 | Spierling ............... B64D 31/06 |

OTHER PUBLICATIONS

French Search Report for French Application No. FR 1908442, Completed by the French Patent Office, dated Mar. 3, 2020, 7 pages.

\* cited by examiner

METHOD OF ELECTRICALLY POWERING AN ELECTRICITY NETWORK, AND AN ELECTRICAL ARCHITECTURE

CROSS-REFERENCE TO RELATED APPLICATIONS

This application claims priority to French patent application No. FR 19 08442 filed on Jul. 25, 2019, the disclosure of which is incorporated in its entirety by reference herein.

BACKGROUND OF THE INVENTION

(1) Field of the Invention

The present invention lies in the field of electrical architectures for vehicles, and in particular for aircraft.

(2) Description of Related Art

The present invention relates to a method of electrically powering a vehicle electricity network that is not voltage-regulated, and also to an electrical architecture including such a non-voltage-regulated electricity network.

The present invention is particularly intended for electrically powering electric motors of an electrical propulsion system for a vehicle such as a road vehicle or indeed an aircraft.

For example, a multirotor aircraft may have a plurality of rotors contributing to providing the aircraft with lift and/or with propulsion, which rotors are driven in rotation by one or more electric motors.

An electrical architecture generally comprises one or more sources of electrical energy together with at least one electricity network and one or more pieces of electrical equipment, where such electrical equipment may, for example, comprise electric motors that are electrically connected to the electricity network and that are electrically powered by at least one electrical energy source via the electricity network.

A source of electrical energy may comprise a rechargeable electrical energy storage device such as a battery, or indeed a supercapacitor.

A source of electrical energy may also comprise an electrical power generation device. An electrical power generation device may comprise a fuel cell, e.g. consuming hydrogen in order to produce electrical energy. An electrical power generation device may comprise an electrical machine that is capable of operating at least in generator mode and that is driven in rotation by a rotary member. Such a rotary member may be the shaft of an engine. The term "engine" is used herein to designate a machine for converting heat energy into mechanical work, such as a gas turbine or a piston engine . . . . An electrical power generation device comprising an engine and a fuel-burning engine driving the electrical machine in rotation constitutes a source of electrical energy that is said to be "hybrid".

These various sources of electrical energy are of different kinds, and consequently they present electrical behaviors that are different.

In particular, a rechargeable electrical energy storage device delivers power in the form of direct current (DC) at a voltage that generally decreases as the quantity of energy contained in the rechargeable electrical energy storage device decreases. For a battery, the delivered voltage is also linked to the open-circuit voltage and to the internal resistance of the battery.

An electrical machine generally delivers power in the form of alternating current (AC), and it therefore needs to be associated with a rectifier in order to transform the AC into DC. Also, depending on its design, an electrical machine may be capable of delivering power at a voltage that is substantially constant, e.g. regulated, or else at a voltage that can vary while it is in operation.

Conventionally, in an electrical architecture, a source of electrical energy is generally connected to an electricity network or to a bus that presents a voltage that is constant in order to be effective in powering the various pieces of electrical equipment connected to the electricity network or to the bus. For the purposes of simplification, the term "electricity network" is used below to cover both an electricity network proper, and also a bus.

Under such circumstances, an electricity converter, e.g. a DC/DC converter, is arranged between a source of electrical energy and the electricity network. The electricity converter thus serves to regulate the voltage received by the electricity network so as to enable it to match the voltage used by the electricity network regardless of the voltage delivered by the source of electrical energy.

Furthermore, in the presence of a rechargeable electrical energy storage device, an electricity converter arranged between the electrical energy storage device and the electricity network makes it possible, where appropriate, for the electrical energy storage device to be recharged electrically by one or more other sources of electrical energy that are connected to the electricity network.

Also, when the pieces of electrical equipment connected to an electricity network require high levels of power, such as electric motors for propelling a vehicle, use is made of a "high-power" electricity converter, which may be of considerable weight. Specifically, a high-power electricity converter generally has power density of the order of 1 kilowatt (kW) to 10 kW per kilogram (kg), as a function in particular of the mode of cooling used, typically air or liquid cooling, and as a function of the electrical isolation needs of its transformer portion. Under such circumstances, for an electric motor having power of the order of 100 kW, the electrical architecture includes at least one high-power electricity converter having a weight in the range of 10 kg to 100 kg, which is significant and penalizing for the total weight of the vehicle.

By way of example, the art prior of the invention includes Document FR 3 056 555 describing a propulsion system for a multirotor aircraft having its rotors driven in rotation by electric motors powered by an electricity network. As sources of electrical energy, the electricity network may include an electrical power generation device provided with an electrical machine driven in rotation by an engine, and/or with an electrical energy storage device, e.g. such as a battery. The electricity network also includes rectifiers and electricity converter device such as inverters, in order to transform the power as supplied by an electrical power generation device and/or the power as supplied to an electric motor.

Also, when an electrical architecture includes a plurality of sources of electrical energy, they are capable of operating simultaneously, either on a continuous basis, or else as a function of the operating conditions of the vehicle and/or of its stage of flight when the vehicle is an aircraft.

Document US 2008/0143119 describes a motor vehicle electrical system including an electricity generator that charges a battery in order to power various electrical loads of the vehicle. That system incorporates current detection apparatus for detecting the current flow of the battery. The electricity generator incorporates integrated control apparatus, for the purpose of controlling the voltage at its output by adjusting a mean level of excitation current.

Document EP 0 953 472 describes a method of controlling the state of charge of a battery of a hybrid road vehicle in dependence on a state of charge established at full charge by controlling an electricity generator and a fuel cell. That method has a step of controlling the electric current output and also the production of electric current by the fuel cell and the electric current output of the generator.

Document XP028516095 ("Fuel cell and Li-ion battery direct hybridization system for aircraft applications") describes the use of a fuel cell and of a Li-ion battery hybridization system. Diodes act as a DC/DC converter replacing those normally used for adjusting the voltages of the fuel cell and of the batteries.

Document U.S. Pat. No. 5,778,997 describes an electric car developed to eliminate the exhaust gases emitted by an internal combustion engine. A circuit forms a rectifier unit connected to a battery and it rectifies the output current from a generator.

Document US 2006/0043938 describes an electrical system for attenuating the impact of large intermittent loads on a 12 volt (V) vehicle power distribution system. One approach consists in regulating the voltage for critical loads by using a separate boost converter.

BRIEF SUMMARY OF THE INVENTION

An object of the present invention is thus to propose a method of electrically powering an electricity network and also to propose an electrical architecture, making it possible to obviate the above-mentioned limitations and to optimize the weight of the electrical architecture.

The present invention provides a method for electrically powering a non-voltage-regulated electricity network of a vehicle. The vehicle includes an electrical architecture, e.g. provided with:

at least two sources of electrical energy including both at least one rechargeable electrical energy storage device and also at least one electrical power generation device;

a main electricity network electrically connected directly to said at least two sources of electrical energy; and at least one piece of electrical equipment electrically powered by the main electricity network.

The method of the invention for electrically powering a non-voltage-regulated electricity network of a vehicle is remarkable in that it comprises the following steps:

a first powering step for electrically powering the main electricity network by said at least one rechargeable electrical energy storage device with first power at a first voltage;

a second powering step for electrically powering the main electricity network by said at least one electrical power generation device with second power at a second voltage, said second voltage being equal to said first voltage; and a regulating step for regulating the internal voltage of said at least one electrical power generation device as a function of the first power.

The method of the invention for electrically powering a non-voltage-regulated electricity network of a vehicle thus serves advantageously to manage sources of electrical energy that are of different kinds and that present different behaviors in order to guarantee that each piece of electrical equipment is supplied continuously with power regardless of the state of each source of electrical energy.

Specifically, the main electricity network is electrically connected to the sources of electrical energy directly, i.e. it is connected without transformation or modification of the power supplied by each electrical energy source prior to reaching the main electricity network. Consequently, this electrical architecture advantageously does not include any electricity converter between any of the sources of electrical energy and the main electricity network. As a result, each source of electrical energy supplies power directly to the main electricity network. The power supplied by each source of electrical energy is generally in the form of DC.

Nevertheless, in the ambit of the invention, a contactor, a switch, or any equivalent device may be arranged between a source of electrical energy and the main electricity network. Specifically, a contactor or a switch serves solely to open or to close the electrical connection between the source of electrical energy and the main electricity network. As a result, power can be allowed to flow or can be prevented from flowing between the source of electrical energy and the main electricity network. Nevertheless, such a contactor or such a switch does not introduce any kind of transformation or conversion of the power.

Furthermore, since the sources of electrical energy are connected to the same main electricity network, the sources of electrical energy supply power at the same voltage.

Concerning the sources of electrical energy, a rechargeable electrical energy storage device may comprise a battery and/or a supercapacitor, for example. Such a rechargeable electrical energy storage device delivers first power at a first voltage that is not regulated. By way of example, this first voltage may vary as a function of the state of the storage device, and in particular as a function of the quantity of energy available in the rechargeable electrical energy storage device. For example, the voltage of the power delivered by a rechargeable electrical energy storage device when it contains a maximum quantity of electrical energy is higher than the voltage of the power delivered by the same rechargeable electrical energy storage device when it contains a smaller quantity of electrical energy.

Concerning the sources of electrical energy, an electrical power generation device may comprise a fuel cell and/or an electrical machine driven in rotation by an engine, for example. An electrical machine may include a rectifier in order to transform AC generated by the rotation of the electrical machine into DC that is supplied to the main electricity network.

Such a rectifier may also be electrically connected to the electrical machine and may be arranged between the electrical machine and the main electricity network. Under such circumstances, the electrical power generation device comprises the electrical machine, an engine, and the rectifier.

Such electrical power generation device comprising an electrical machine is capable of delivering power having characteristics, i.e. voltage and current, that may vary as a function of one or more operating parameters of the electrical power generation device. In particular, these characteristics of the power delivered by an electrical machine may be defined as a function of an internal voltage of the electrical machine, also referred to as electromotive force (emf).

For example, for a synchronous electrical machine with separate excitation, the internal voltage of the electrical machine is defined by an excitation current of the electrical machine, e.g. coming from a regulator external to the electrical machine. For substantially constant excitation current, the internal voltage of such a synchronous electrical machine is substantially constant, and consequently the characteristics of the power delivered by the synchronous electrical machine are then substantially constant. Variation in this excitation current gives rise to variation in the internal voltage of the synchronous electrical machine, and consequently to variation in the characteristics of the power delivered by the electrical power generation device.

Substantially analogous operation is to be found in a variable induction or a variable reluctance electrical machine, or indeed in a switched reluctance machine, in which the internal voltage that is delivered is determined by power generated by an inverter included in the electrical machine.

The internal voltage of electrical power generation device may also vary as a function of the speed of rotation of the electrical machine and thus of the engine that drives it. By way of example, this applies to an electrical machine with permanent excitation, such as a permanent-magnet synchronous generator generally referred to as a permanent magnet generator or "PMG". Under such circumstances, any variation in the speed of rotation of the engine gives rise to variation in the internal voltage of the electrical machine, and consequently to variation in the characteristics of the power delivered by the electrical power generation device.

When the electrical power generation device comprises a fuel cell, the internal voltage of the fuel cell is defined as a function of the flow rate of fuel, e.g. of hydrogen. Consequently, a variation in the flow rate of fuel gives rise to a variation in the internal voltage of the fuel cell, and consequently to a variation in the characteristics of the power delivered by the fuel cell.

Electrical energy sources of different kinds and behaviors can thus supply the main electricity network with power at voltages that can vary and thus be different. The voltage of the main electricity network is determined by a rechargeable electrical energy storage device regardless of its mode of operation, i.e. regardless of whether it is delivering power or is recharging, and each electrical power generation device then adapts to and operates at that voltage. Consequently, the main electricity network powers each piece of electrical equipment with power at a voltage that can vary. Specifically, in the context of the invention, the main electricity network is not regulated to have a voltage that is constant, and the electrical architecture does not include any electricity converter between each source of electrical energy and the main electricity network. Also, the pieces of electrical equipment connected to the main electricity network must therefore be adapted to be capable of being powered by power at different voltages.

Not having any electricity converter serves advantageously to contribute to reducing significantly the weight of the electrical architecture, in particular when the main electricity network delivers power at a voltage that is considerable.

The method of electrically powering a non-voltage-regulated electricity network may further comprise one or more of the following characteristics, taken singly or in combination.

In one aspect, when at least one rechargeable electrical energy storage device and at least one electrical power generation device are jointly powering the main electricity network, then during the regulating step, the internal voltage of said at least one electrical power generation device may be regulated as a function of the first voltage and the first current of the first power.

In another aspect, when the main electricity network is being powered solely by at least one electrical power generation device, the internal voltage of said at least one electrical power generation device may be regulated in such a manner that at least one electrical power generation device is powering the main electricity network. Thus, firstly the main electricity network supplies electrical energy to at least one rechargeable electrical energy storage device in order to charge it electrically, and secondly the main electricity network supplies power to at least one piece of electrical equipment that is connected to the main electricity network.

Consequently, regulating the internal voltage of each electrical power generation device enables each electrical power generation device to supply necessary and sufficient power to the main electricity network, either to power the main electricity network in parallel with the rechargeable electrical energy storage device, or else to power the main electricity network on its own, and also, where appropriate, to recharge the rechargeable electrical energy storage device.

Furthermore, the internal voltage of said at least one electrical power generation device may then be regulated in such a manner that the main electricity network delivers power comprising both recharging power for recharging said at least one rechargeable electrical energy storage device and also power for powering said at least one piece of electrical equipment.

The recharging power may be at constant current. When a rechargeable electrical energy storage device is an electric battery having storage cells, the recharging power may be at constant current up to a predefined voltage threshold during a first stage of recharging said rechargeable electrical energy storage device, and then the recharging power may be at constant voltage.

By way of example, the power may correspond to the power required for powering each of the respective pieces of electrical equipment.

When at least one electrical power generation device comprises an electrical machine and an engine driving the electrical machine in rotation, the regulating step may regulate a speed of rotation of the engine so that the electrical power generation device operates with the required internal voltage and then delivers the second power with the required second voltage and current. The speed of rotation of the engine can thus be regulated as a function of the first voltage of the first power, e.g. when the electrical machine is a permanent magnet synchronous electrical machine.

When at least one electrical power generation device comprises an electrical machine and an engine driving the electrical machine in rotation, the regulating step may equally well regulate a control current for controlling the electrical machine so that the electrical power generation device operates with the required internal voltage and then delivers the second power with the required second voltage and current. The control current for controlling the electrical machine may thus be regulated as a function of the first voltage of the first power. By way of example, the control current for controlling an electrical machine may be the excitation current of a separately-excited synchronous electrical machine or else it may be the power generated by an inverter of a variable induction or a variable reluctance electrical machine, or indeed of a switched reluctance machine.

In another aspect, the method may include a disconnecting step for disconnecting at least one rechargeable electrical energy storage device from the main electricity network. By way of example, this disconnection of at least one rechargeable electrical energy storage device from the main electricity network may occur as a result of the rechargeable electrical energy storage device being fully charged and may be for the purpose of conserving its electrical energy for subsequent use. This disconnection may also occur in the event of detecting a fault on the rechargeable electrical energy storage device, such as overheating, excess voltage, insufficient voltage, or indeed an electrical short circuit, for example.

In another aspect, the method may also include a monitoring step for monitoring the second current of the second power supplied by at least one electrical power generation device in order to verify that the second current does not exceed a maximum value. By way of example, this maximum value may correspond to the maximum current that can be delivered by the electrical power generation device without them being subjected to degradation.

The method may also include a connecting step for connecting at least one rechargeable electrical energy storage device to said main electricity network, the connecting step being activated whenever the second current is greater than the maximum value so as to reduce the second current of the second power supplied by the at least one electrical power generation device. Specifically, under such circumstances, the rechargeable electrical energy storage device may supply the first power to the main electricity network in such a manner that the electrical power generation device supplies the second power at a reduced second current.

The present invention also provides an electrical architecture for a vehicle, and comprising:

at least two sources of electrical energy, including at least one rechargeable electrical energy storage device and at least one electrical power generation device, said at least one rechargeable electrical energy storage device delivering first power at a first voltage that is not regulated;

a main electricity network; and at least one piece of electrical equipment electrically powered by the main electricity network.

This electrical architecture is remarkable in that said at least two sources of electrical energy are electrically connected directly to said main electricity network, and the electrical architecture includes a regulator device for regulating an internal voltage of said at least one electrical power generation device so that said at least one electrical power generation device supplies a second power to the main electricity network as a function of the first power, the main electricity network delivering power at a voltage that is not constant.

By way of example, the vehicle may include a power plant provided with one or more electric motors constituting one or more pieces of electrical equipment connected to the main electricity network. Also, the vehicle may be an aircraft including at least one rotor, each rotor being driven in rotation by a respective electric motor.

The vehicle may also include a calculator for performing the steps of the above-described method. By way of example, the calculator may comprise at least one processor, at least one integrated circuit, at least one programmable system, at least one logic circuit, or any equivalent device, these examples not limiting the scope to be given to the term "calculator". The calculator may also include a memory serving in particular to store instructions for the steps of the method.

An electrical power generation device may comprise a fuel cell and/or an electrical machine and an engine for driving said electrical machine in rotation.

An electrical power generation device may comprise non-regulated electrical power generation device delivering second power at a non-regulated second voltage. By way of example, the characteristics of the second power may vary as a function of an internal voltage of the electrical power generation device. When the electrical power generation device comprise an electrical machine and an engine, the internal voltage may itself vary as a function of the speed of rotation of the engine of the electrical power generation device, or else as a function of a control current for controlling the electrical machine.

The regulator device may then comprise a device for regulating the speed of rotation of the engine, or else for regulating the control current for controlling the electrical machine.

An electrical power generation device may also comprise regulated electrical power generation device delivering second power at a second voltage regulated by a regulator system included in the electrical power generation device.

The electrical architecture may also include at least one secondary electricity network and at least one electricity converter device connecting the main electricity network to each secondary electricity network. Each secondary electricity network delivers power at a voltage that is different from a voltage of the power delivered by the main electricity network. A converter device serves to transform the power delivered by the main electricity network, e.g. by modifying its voltage before it reaches the secondary network.

By way of example, the main electricity network is a so-called "low-voltage" electricity network, and each secondary electricity network is a so-called "very low-voltage" electricity network. A low-voltage electricity network delivers DC, e.g. at a voltage higher than 50 V, and a very low-voltage secondary electricity network delivers DC e.g. at a voltage lower than 50 V.

Also, by way of example, at least one piece of electrical equipment may be an electric motor for propelling the vehicle. Under such circumstances, each electric motor in association with each source of electrical energy may form a power plant. The power plant may be considered as being "hybrid" when at least one electrical power generation device comprises an electrical machine driven in rotation by an engine.

Furthermore, the vehicle may be a multirotor aircraft including a plurality of rotors, each rotor being driven in rotation by a respective electric motor of the aircraft in order to provide the aircraft with lift and with propulsion.

The present invention also provides an electrical propulsion system for a vehicle, and in particular for an aircraft. When it is for an aircraft, the electrical propulsion system comprises an electrical architecture as described above together with at least one rotor. At least one piece of electrical equipment of the electrical architecture is an electric motor driving rotation of a rotor of the aircraft.

BRIEF DESCRIPTION OF THE DRAWINGS

The invention and its advantages appear in greater detail in the context of the following description of embodiments given by way of illustration and with reference to the accompanying figures, in which.

DETAILED DESCRIPTION OF THE INVENTION

Elements that are present in more than one of the figures are given the same references in each of them.

Figure 1:
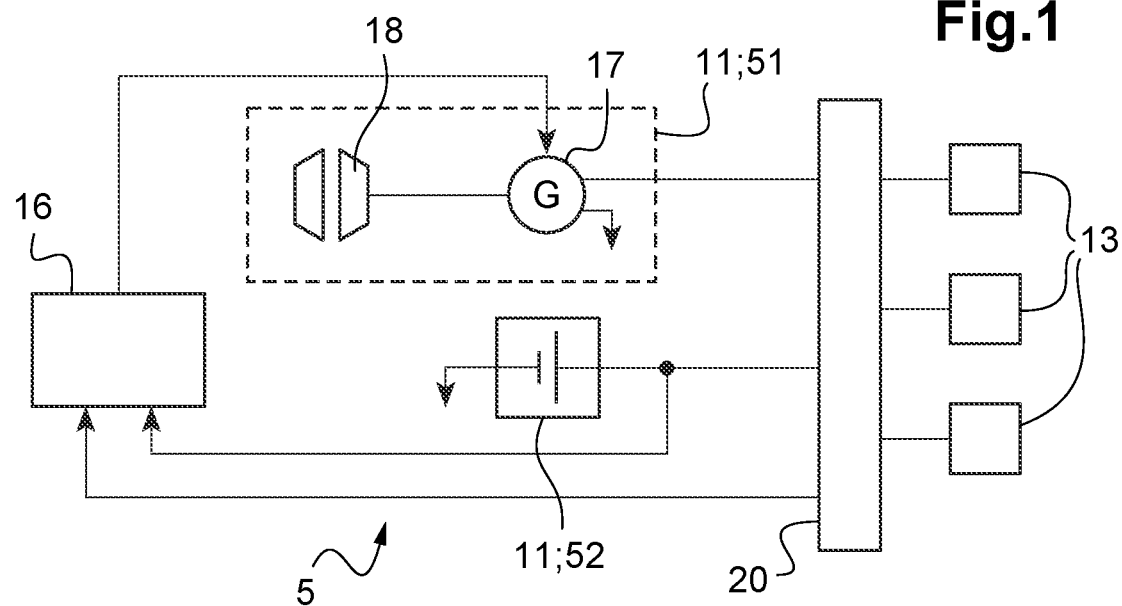
FIG. 1 shows a first electrical architecture.
Figure 2:
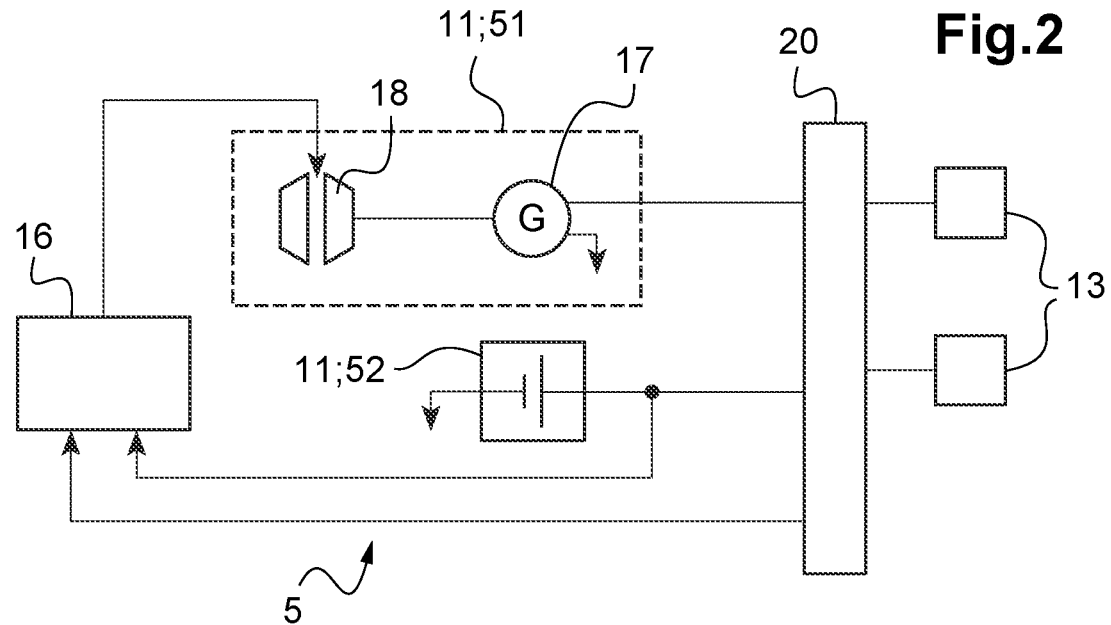
FIG. 2 shows a second electrical architecture.
Figure 3:
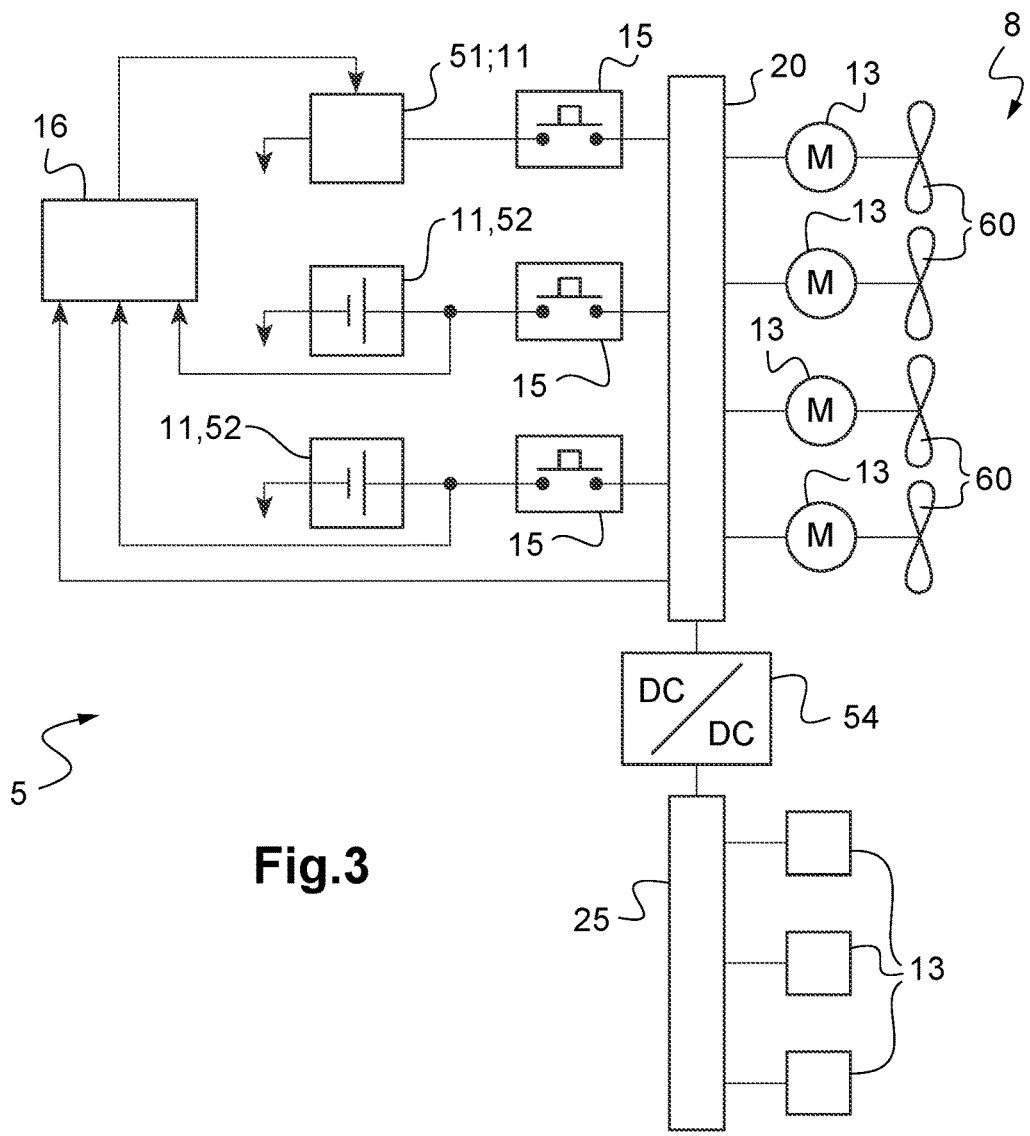
FIG. 3 shows a third electrical architecture.

FIGS. 1 to 3 show three embodiments of an electrical architecture 5 of the invention for a vehicle, e.g. a road vehicle or indeed an aircraft.

In a manner that is common to these three embodiments, an electrical architecture 5 comprises at least two sources 11 of electrical energy, a main electricity network 20 electrically connected to the sources 11 of electrical energy, pieces of electrical equipment 13 that are electrically powered by the main electricity network 20, and a regulator device 16. The sources 11 of electrical energy comprise at least one rechargeable electrical energy storage device 52 and at least one electrical power generation device 51.

Each rechargeable electrical energy storage device 52 delivers first power at a first voltage that is not regulated. The first voltage may vary in particular as a function of the quantity of electrical energy contained in said rechargeable electrical energy storage device 52. By way of example, a rechargeable electrical energy storage device 52 may be a battery or indeed a supercapacitor.

By way of example, an electrical power generation device 51 may comprise an electrical machine 17 and an engine 18, the engine driving rotation of the electrical machine 17 operating in generator mode. An electrical power generation device 51 may equally well comprise a fuel cell. An electrical power generation device 51 delivers second power at a second voltage that may be substantially constant or else that may be variable, depending on the technology of the electrical power generation device 51.

The sources 11 of electrical energy are electrically connected directly to the main electricity network 20. By way of example, the sources 11 of electrical energy may be electrically connected to the main electricity network 20 merely by continuous electrical connections, as shown in FIGS. 1 and 2. It is also possible for the sources 11 of electrical energy to be electrically connected to the main electricity network 20 via electrical connections including contactors 15, as shown in FIG. 3.

The contactor 15 serves solely to close or to open the electrical connection between a source 11 of electrical energy and the main electricity network 20, but it does not transform the power delivered by the source 11 of electrical energy before it reaches the main electricity network 20. The contactor 15 may also be replaced by a switch or by any equivalent device enabling an electrical connection to be closed or opened.

Since the main electricity network 20 is electrically connected to the electrical power generation device 51 and to the rechargeable electrical energy storage device 52, the second voltage of the second power is equal to the first voltage of the first power. The rechargeable electrical energy storage device 52 sets the voltage of the main electricity network 20 as being equal to the first voltage, regardless of whether it is delivering power or is being recharged. The electrical power generation device 51 adapts to the voltage of the main electricity network 20 and operates with the second voltage equal to the first voltage. The voltage regulation internal to the electrical power generation device 51 makes it possible to deliver first power to the main electricity network 20 so as to power the main electricity network 20, either in parallel with the rechargeable electrical energy storage device 52, or else on its own, and where appropriate, also to recharge the rechargeable electrical energy storage device 52.

In the first embodiment of the electrical architecture 5 shown in FIG. 1, the sources 11 of electrical energy comprise a rechargeable electrical energy storage device 52 and an electrical power generation device 51 provided with an electrical machine 17 and with an engine 18 driving the electrical machine 17 in rotation. The regulator device 16 is connected to the electrical machine 17 and to the electrical connection connecting the rechargeable electrical energy storage device 52 to the main electricity network 20.

The regulator device 16 thus serves to regulate a control current for controlling the electrical machine 17 as a function of the first power delivered by the rechargeable electrical energy storage device 52. By way of example, the control current may be excitation current (or "field" current), or it may be current generated by an inverter, depending on the technology of the electrical machine 17. As a result, by means of the control current, the regulator device 16 serves to regulate the electromotive force of the electrical machine 17 (also referred to as its "internal voltage"), with the consequence that the electrical power generation device delivers the second power at the required second voltage as a function of the first power delivered by the rechargeable electrical energy storage device 52.

By way of example, the regulator device 16 comprises an electricity measurement device and a calculator. The measurement device serves in particular to characterize the first power delivered by the rechargeable electrical energy storage device 52. By way of example, the measurement device may measure the current or else the voltage of the first power. By way of example, the calculator may comprise at least one processor, at least one integrated circuit, at least one programmable system, at least one logic circuit, or any equivalent device, these examples not limiting the scope to be given to the term "calculator".

In the second embodiment of the electrical architecture 5 shown in FIG. 2, the sources 11 of electrical energy comprise a rechargeable electrical energy storage device 52 and electrical power generation device 51 provided with an electrical machine 17 and with an engine 18 driving the electrical machine 17 in rotation. The regulator device 16 is connected to the engine 18 and to the electrical connection connecting the rechargeable electrical energy storage device 52 to the main electricity network 20.

The regulator device 16 then serves to regulate the speed of rotation of the engine 18 as a function of the first power delivered by the rechargeable electrical energy storage device 52. Under such circumstances, the electromotive force of the electrical machine 17 is a function of the speed of rotation of the engine 18. As a result, by means of the speed of rotation of the engine 18, the regulator device 16 serves to regulate the emf of the electrical machine 17, and consequently the electrical power generation device 51 delivers the second power with the required second voltage as a function of the first power delivered by the rechargeable electrical energy storage device 52.

In the third embodiment of the electrical architecture 5 shown in FIG. 3, the sources 11 of electrical energy comprise two rechargeable electrical energy storage devices 52 and electrical power generation device 51. The electrical power generation device 51 may comprise a fuel cell or else an electrical machine 17 and an engine 18 for driving the electrical machine 17 in rotation. The regulator device 16 is connected to the electrical power generation device 51 and to the electrical connection connecting each rechargeable electrical energy storage device 52 to the main electricity network 20. The regulator device 16 may be in accordance with either of the two embodiments of the regulator device 16 as described with reference to FIGS. 1 and 2.

The electrical architecture 5 also includes contactors 15 arranged respectively between each source 11 of electrical energy and the main electricity network 20. A contactor 15 serves to open or to close the electrical connection between a source 11 of electrical energy and of the main electricity network 20.

The electrical architecture 5 also includes a secondary electricity network 25 and a converter device 54. The converter device 54 is electrically connected to the main electricity network 20 and to the secondary electricity network 25. As a result, the secondary electricity network 25 can deliver power at a voltage that is different from a voltage of the power delivered by the main electricity network 20. By way of example, the main electricity network 20 may be a so-called "low-voltage" electricity network delivering DC at a voltage higher than 50 V, and the secondary electricity network 25 may be a so-called "very low-voltage" electricity network delivering DC at a voltage lower than 50 V. Pieces of electrical equipment 13 are also connected to the secondary electricity network 25.

FIG. 3 also shows a propulsion system 8. By way of example, this propulsion system 8 is for an aircraft and includes the electrical architecture 5 and four rotors 60. Each rotor 60 is mechanically connected to a respective piece of electrical equipment 13 constituted by an electric motor. As a result, the rotors 60 are driven in rotation by respective electric motors and can serve to provide an aircraft with lift and with propulsion.

Each of these electrical architectures 5 is thus capable, advantageously, of managing the sources 11 of electrical energy that they include, which are of different kinds and which present different behaviors, and of doing so in such a manner as to guarantee continuity of power supplied to each piece of electrical equipment 13, regardless of the state of each source 11 of electrical energy.

Specifically, the main electricity network 20 is electrically connected to the sources 11 of electrical energy in direct manner, i.e. without transformation or modification of the power supplied by each source 11 of electrical energy, and thus advantageously does not include any electricity converter between a source 11 of electrical energy and the main electricity network 20.

Also, in the three embodiments of electrical architectures 5 shown in FIGS. 1 to 3, the regulator device 16 is also connected to the main electricity network 20 and can thus monitor the voltage of the power delivered by the main electricity network 20 in order to protect the battery 52 in the event of the voltage being too high or too low.

Figure 4:
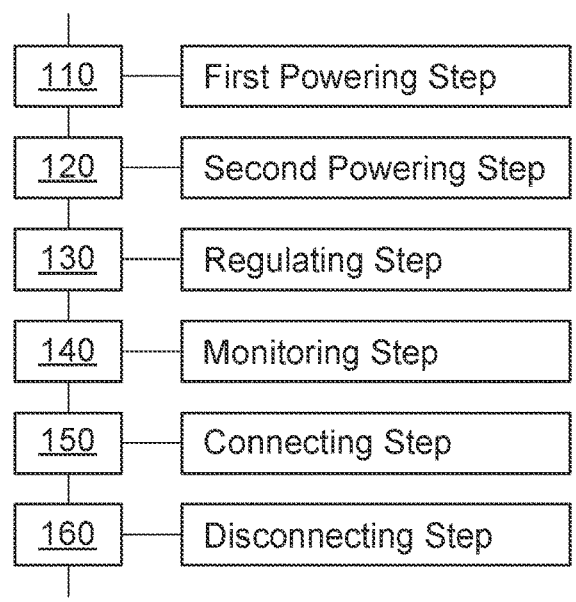
FIG. 4 is a diagram summarizing a method of electrically powering a non-voltage-regulated electricity network of a vehicle.

A diagram summarizing a method of electrically powering a non-voltage-regulated electricity network of a vehicle is shown in FIG. 4. The method may be applied to the above-described electrical architectures 5 and it comprises essential steps 110, 120, 130, and optional steps 140, 150, 160. The vehicle fitted with such an electrical architecture 5 may also include a calculator for performing the steps.

The main electricity network 20 is electrically powered in a first powering step 110 by at least one rechargeable electrical energy storage device 52 delivering the first power. The first voltage of this first power may vary, mainly as a function of the quantity of energy available in the rechargeable electrical energy storage device 52.

The main electricity network 20 is electrically powered in a second powering step 120 by an electrical power generation device 51 delivering the second power. The second voltage of this second power may vary mainly as a function of one or more parameters of the electrical power generation device 51, depending on its technology, e.g. depending on the control current for controlling the electrical machine 17 that it includes, or else on the speed of rotation of the engine 18 driving the electrical machine 17. Also, the second voltage of the second power is equal to the first voltage of the first power, the first and second powers having the same electrical potential, both of these two powers being electrically connected to the main electricity network 20.

Thereafter, the internal voltage of the electrical power generation device 51 is regulated in a regulating step 130 as a function of the first power. This regulation thus serves to adapt the internal voltage of the electrical power generation device 51 so that the second power is adapted (i.e. matched) to the first voltage of the first power as delivered by a rechargeable electrical energy storage device 52.

Depending on the technology of the electrical power generation device 51, the regulating step 130 may act differently on the electrical power generation device 51. By way of example, the regulating step 130 may comprise regulating a control current for an electrical machine 17 included in the electrical power generation device 51 as a function of the first voltage of the first power. By way of example, the control current may be the excitation current of a separately-excited synchronous electrical machine or the current generated by an inverter of a variable induction or variable reluctance electrical machine, or indeed of a switched reluctance machine.

The regulating step 130 may also regulate a speed of rotation of the engine 17 included in the electrical power generation device 51 as a function of the first voltage of the first power.

Furthermore, when both a rechargeable electrical energy storage device 52 and also electrical power generation device 51 are jointly powering the main electricity network 20, then during the regulating step 130, the internal voltage of the electrical power generation device 51 is regulated as a function of the first voltage and as a function of the first current of the first power.

When electrical power generation device 51 is powering the main electricity network 20 on their own, e.g. because the rechargeable electrical energy storage device 52 does not contain sufficient electrical energy, then during the regulating step 130, the internal voltage of the electrical power generation device 51 is regulated so that the electrical power generation device 51 powers of the main electricity network 20. Thus, firstly the main electricity network 20 supplies electrical energy to the rechargeable electrical energy storage device 52 in order to charge it electrically, and secondly the main electricity network 20 supplies power to each piece of electrical equipment 13 that is connected to the main electricity network 20.

The method of the invention for electrically powering a non-voltage-regulated electricity network of a vehicle thus serves advantageously to manage sources 11 of electrical energy that are of different kinds and that present different behaviors, and to guarantee that each piece of electrical equipment 13 is supplied continuously with power regardless of the state of each source 11 of electrical energy.

The method may also include a monitoring step 140 for monitoring the second current of the second power supplied by electrical power generation device 51 in order to verify that the second current does not exceed a maximum value. Specifically, in the event of this maximum value being exceeded, the electrical power generation device 51 may become degraded.

The method may then also include a connecting step 150 for connecting at least one rechargeable electrical energy storage device 52 to the main electricity network 20. The connecting step 150 is activated in particular as soon as the monitoring step 140 detects a second current greater than the maximum value so as to supply first power to the main electricity network 20 and consequently reduce the second current of the second power supplied by the electrical power generation device 51.

Also, the method may include a disconnecting step 160 for disconnecting at least one rechargeable electrical energy storage device 52 from the main electricity network 20 by means of its contactor 15. This disconnecting step 160 may be applied once the rechargeable electrical energy storage device 52 is fully charged electrically, or else as a result of detecting a malfunction of the rechargeable electrical energy storage device 52.

Naturally, the present invention may be subjected to numerous variations as to its implementation. Although several embodiments are described above, it should readily be understood that it is not conceivable to identify all possible embodiments exhaustively. It is naturally possible to envisage replacing any of the means described by equivalent means without going beyond the ambit of the present invention.

What is claimed is:

1. A method of electrically powering a non-voltage-regulated electricity network of a vehicle, the vehicle including an electrical architecture provided with:
   at least two sources of electrical energy including both at least one rechargeable electrical energy storage device and also at least one electrical power generation device;
   a main electricity network electrically connected directly to the at least two sources of electrical energy; and
   at least one piece of electrical equipment electrically powered by the main electricity network;
   wherein the method comprises the following steps:
   a first powering step for electrically powering the main electricity network by the rechargeable electrical energy storage device(s) with first power at a first voltage;
   a second powering step for electrically powering the main electricity network by the at least one electrical power generation device with second power at a second voltage, the second voltage being equal to the first voltage;
   a regulating step for regulating an internal voltage of the at least one electrical power generation device as a function of the first power; and
   a disconnecting step for disconnecting at least one rechargeable electrical energy storage device from the main electricity network.

2. The method according to claim 1;
   wherein, when the at least one rechargeable electrical energy storage device(s) and the electrical power generation device are jointly powering the main electricity network, during the regulating step, the internal voltage of the at least one electrical power generation device is regulated as a function of the first voltage and of a first current of the first power.

3. The method according to claim 1;
   wherein when the at least one electrical power generation device is/are powering the main electricity network on their own, during the regulating step, the internal voltage of the at least one electrical power generation device is regulated so that the at least one electrical power generation device power(s) the main electricity network in such a manner that the main electricity network firstly supplies electrical energy to at least one rechargeable electrical energy storage device so as to charge the rechargeable electrical energy storage device(s) electrically, and secondly electrically powers one or more pieces of electrical equipment.

4. The method according to claim 3;
   wherein the internal voltage of the at least one electrical power generation device is regulated in such a manner that the main electricity network delivers power comprising recharging power for recharging the rechargeable electrical energy storage device(s) and power for powering one or more pieces of electrical equipment.

5. The method according to claim 4;
   wherein the recharging power is at constant current,
   wherein, when a rechargeable electrical energy storage device is an electric battery having storage cells, the recharging power is at constant current up to a predefined voltage threshold during a first stage of recharging the rechargeable electrical energy storage device, and then the recharging power is at constant voltage, and
   wherein the power corresponds to power required for powering one or more pieces of electrical equipment.

6. A method of electrically powering a non-voltage-regulated electricity network of a vehicle, the vehicle including an electrical architecture provided with:
   at least two sources of electrical energy including both at least one rechargeable electrical energy storage device and also at least one electrical power generation device;
   a main electricity network electrically connected directly to the at least two sources of electrical energy; and
   at least one piece of electrical equipment electrically powered by the main electricity network;
   wherein the method comprises the following steps:
   a first powering step for electrically powering the main electricity network by the rechargeable electrical energy storage device(s) with first power at a first voltage;
   a second powering step for electrically powering the main electricity network by the at least one electrical power generation device with second power at a second voltage, the second voltage being equal to the first voltage;
   a regulating step for regulating an internal voltage of the at least one electrical power generation device as a function of the first power; and
   a monitoring step for monitoring the second current of the second power in order to verify that the second current of the second power does not exceed a maximum value.

7. The method according to claim 6;
   wherein, when the at least one rechargeable electrical energy storage device(s) and the electrical power generation device are jointly powering the main electricity network, during the regulating step, the internal voltage of the at least one electrical power generation device is regulated as a function of the first voltage and of a first current of the first power.

8. The method according to claim 6;
   wherein when the at least one electrical power generation device is/are powering the main electricity network on their own, during the regulating step, the internal voltage of the at least one electrical power generation device is regulated so that the at least one electrical power generation device power(s) the main electricity network in such a manner that the main electricity network firstly supplies electrical energy to at least one rechargeable electrical energy storage device so as to charge the rechargeable electrical energy storage device(s) electrically, and secondly electrically powers one or more pieces of electrical equipment.

9. The method according to claim 8;
wherein the internal voltage of the at least one electrical power generation device is regulated in such a manner that the main electricity network delivers power comprising recharging power for recharging the rechargeable electrical energy storage device(s) and power for powering one or more pieces of electrical equipment.

10. The method according to claim 9;
wherein the recharging power is at constant current.

11. The method according to claim 9;
wherein, when a rechargeable electrical energy storage device is an electric battery having storage cells, the recharging power is at constant current up to a predefined voltage threshold during a first stage of recharging the rechargeable electrical energy storage device, and then the recharging power is at constant voltage.

12. The method according to claim 9;
wherein the power corresponds to power required for powering one or more pieces of electrical equipment.

13. The method according to claim 6;
wherein at least one electrical power generation device comprises an electrical machine and an engine driving the electrical machine in rotation, the regulating step serving to regulate a speed of rotation of the engine so that the electrical power generation device operate with the second internal voltage.

14. The method according to claim 6;
wherein at least one electrical power generation device comprises an electrical machine and an engine driving the electrical machine in rotation, the regulating step serving to regulate a control current for controlling the engine so that the electrical power generation device operate with the internal voltage.

15. The method according to claim 6;
wherein the method includes a connecting step for connecting at least one rechargeable electrical energy storage device to the main electricity network, the connecting step being activated whenever the second current is greater than the maximum value so as to reduce the second current of the second power supplied by the at least one electrical power generation device.

16. An electrical architecture for a vehicle, the vehicle including:
at least two sources of electrical energy, including at least one rechargeable electrical energy storage device and at least one electrical power generation device, the rechargeable electrical energy storage device(s) delivering first power at a first voltage that is not regulated;
a main electricity network; and
at least one piece of electrical equipment electrically powered by the main electricity network;
wherein the at least two sources of electrical energy are electrically connected directly to the main electricity network, and the electrical architecture includes a regulator device for regulating an internal voltage of the at least one electrical power generation device so that the at least one electrical power generation device supplies/supply second power to the main electricity network as a function of the first power, the main electricity network delivering power at a voltage that is not regulated,
wherein the electrical architecture includes at least one secondary electricity network and at least one respective electricity converter device connecting the main electricity network to the secondary electricity network(s), the secondary electricity network(s) delivering power at a voltage different from a voltage of power delivered by the main electricity network.

17. The electrical architecture according to claim 16;
wherein at least one electrical power generation device comprises an electrical machine and an engine driving the electrical machine in rotation, the regulator device is a regulator device serving to regulate a control current for controlling the engine so that the electrical power generation device operate with the internal voltage.

18. The electrical architecture according to claim 16;
wherein at least one electrical power generation device comprises an electrical machine and an engine driving the electrical machine in rotation, the regulator device is a regulator device serving to regulate a speed of rotation of the engine so that the electrical power generation device operate(s) with the internal voltage.

19. The electrical architecture according to claim 16;
wherein at least one piece of electrical equipment is an electric motor.

20. An electrical propulsion system for an aircraft according to claim 19;
wherein the electrical propulsion system includes at least one secondary electricity network and at least one respective electricity converter device connecting the main electricity network to the secondary electricity network(s), the secondary electricity network(s) delivering power at a voltage different from a voltage of power delivered by the main electricity network and at least one rotor, the rotor(s) being driven by the electric motor.

* * * * *